US005120334A

United States Patent [19]

Cooper

[11] Patent Number: 5,120,334

[45] Date of Patent: Jun. 9, 1992

[54] AIR CLEANER FOR INTERNAL COMBUSTION ENGINE

[75] Inventor: David G. Cooper, Huron, Ohio

[73] Assignee: Ford Motor Company, Dearborn, Mich.

[21] Appl. No.: 704,558

[22] Filed: May 23, 1991

[51] Int. Cl.[5] ............................................ B01D 46/00

[52] U.S. Cl. .................................... 55/385.3; 55/276; 55/502; 55/497; 55/274; 123/198 E

[58] Field of Search .................... 55/276, 385.1, 385.3, 55/502, 497, 503, 511, 521, 274; 123/198 E

[56] References Cited

U.S. PATENT DOCUMENTS

| | | | |
|---|---|---|---|
| 3,722,275 | 3/1973 | Rodely et al. | 73/194 B |
| 3,849,093 | 11/1974 | Konishi et al. | 55/316 |
| 3,956,928 | 5/1976 | Barrera | 73/116 |
| 3,996,914 | 12/1976 | Crall et al. | 123/198 E |
| 4,006,724 | 2/1977 | Carter | 123/198 E |
| 4,065,276 | 12/1977 | Nakaya et al. | 55/276 |
| 4,312,651 | 1/1982 | Esaki et al. | 55/502 |
| 4,376,204 | 3/1983 | Yamamoto | 123/52 M |
| 4,440,555 | 4/1984 | Chichester | 55/385.3 |
| 4,612,895 | 9/1986 | Kuroiwa et al. | 123/494 |
| 4,637,261 | 1/1987 | Kraus et al. | 73/118.2 |
| 4,692,177 | 9/1987 | Wright et al. | 55/503 |
| 4,759,213 | 7/1988 | Porth et al. | 73/118.2 |
| 4,790,864 | 12/1988 | Kostun | 55/497 |
| 4,826,517 | 5/1989 | Novman | 55/502 |

*Primary Examiner*—Bernard Nozick
*Attorney, Agent, or Firm*—Jerome R. Drouillard; Clifford L. Sadler

[57] ABSTRACT

An air cleaner for an internal combustion engine includes a filter element and a housing having the filter element situated therein, with the housing having an outlet for allowing filtered air to flow to the engine and an inlet permitting entry of air into the housing. The outlet includes a venturi which is integral with the outer wall of the housing and which defines a passage through the wall, with the venturi expanding radially on the inner side of the housing's outer wall.

6 Claims, 2 Drawing Sheets

AIR CLEANER FOR INTERNAL COMBUSTION ENGINE

BACKGROUND OF THE INVENTION

FIELD OF THE INVENTION

This invention relates to an air cleaner for an internal combustion engine having an electronic control system in which an airflow meter precisely measures the amount of air entering the engine's intake. This measurement of the incoming air is facilitated by an integral venturi and air cleaner housing according to the present invention.

DISCLOSURE INFORMATION

Air cleaners for internal combustion engines have taken a variety of forms. For example, wet and dry filter media have been used with a plethora of shapes for the air cleaner housing itself. U.S. Pat. No. 3,849,093 to Konishi et al. discloses the familiar pancake-shaped air cleaner which uses an annular element. U.S. Pat. No. 4,312,651 to Esaki et al. illustrates the familiar cylindrical air cleaner configuration.

Automotive air cleaners have also been made with irregular shapes. Accordingly, U.S. Pat. No. 4,065,276 to Nakaya et al. discloses a free-form molded air cleaner housing having a conical filter element housed therein.

Automotive engineers have applied dry type air cleaners in imaginative ways. For example, U.S. Pat. No. 3,249,172 to DeLorean discloses an air cleaner which draws air through an upper housing which is attached to the engine compartment hood of the vehicle. U.S. Pat. No. 3,996,914 to Crall et al. discloses a structure for mounting an electronic package, including a circuit board, to the exterior of an air cleaner housing.

With the advent of electronic engine controls, automotive designers added airflow monitoring devices to air cleaners. U.S. Pat. No. 3,722,275 to Rodely et al., U.S. Pat. No. 3,956,928 to Barrera, and U.S. Pat. No. 4,006,724 to Carter all disclose airflow monitoring instrumentation mounted in long snorkels leading to the main housing of the air cleaner. Such devices present problems in terms of packaging the long snorkel apparatus. This difficulty is particularly troublesome with vehicles having transversely mounted engines driving the front wheels because vehicles with this type of powerplant are often characterized by dramatically lowered hood lines.

The problems associated with mounting an airflow sensor in a snorkel are obviated by the interior mounted sensors disclosed in U.S. Pat. No. 4,375,204 to Yamamoto and U.S. Pat. No. 4,759,213 to Porth et al. These devices, however, may not be as accurate as sensors which measure all of the air passing into the engine.

It has been known to use an air cleaner assembly having a mass airflow meter mounted to the outside of the housing and receiving air from a multipiece stamped, machined, and welded steel venturi assembly shown in FIGS. 1 and 1A. This venturi assembly is riveted to the inside of the air cleaner housing, but offers several disadvantages. First, the necessity of piercing the housing to apply a plurality of rivets to fasten the separate venturi in place is undesirable because air may leak past the venturi, thereby bypassing the mass airflow sensor which is bolted to the exterior of the housing. This is disadvantageous because the leakage air is introduced to the engine's incoming air charge on the downstream side of the filter element and engine durability may suffer if the leakage air contains abrasive constituents commonly found in many areas.

A second major problem may result from the use of a multipiece venturi assembly which is riveted in place. As noted above, precise measurement of the incoming air charge is required for emissions control and fuel economy reasons. However, with the prior art design, wear effects upon the tooling used to form the venturi from steel or other materials may cause disruptions in the airflow entering the engine. And, the rivets used for attaching the venturi to the air cleaner housing do not comprise a fastening system having sufficient precision to repeatably locate the venturi in the center of the aperture through the housing. Again, disruption of the airflow may result, along with impaired accuracy in measuring the engine's airflow. And, the steel may be subject to corrosive attack regardless of the coating provided.

It is an object of the present invention to provide an automotive air cleaner which is constructed so that all of the air passing in the engine is caused to flow past an airflow sensor mounted to the housing in the air cleaner.

It is another object of the present invention to provide an air cleaner for an automotive engine which has an integral venturi which functions to smooth the flow of air exiting the air cleaner so as to improve the accuracy of the mass flow measurement provided by an airflow sensor attached to the housing of the air cleaner. Accuracy of airflow measurement is important to the calculation of the engine's fuel requirement. And, errors in fuel management can impair emissions control performance and fuel economy.

It is another object of the present invention to provide an air cleaner for an automotive engine which has reduced cost as compared to prior art air cleaners. This is accomplished by eliminating a host of separate stamped and machined parts and associated welding operations. By eliminating such parts, the reliability of the engine is enhanced too because the potential problem of ingesting foreign objects (e.g. loose nuts) into the engine will be mitigated at least as far as the air cleaner system is concerned.

It is yet another object of the present invention to provide an air cleaner for an internal combustion engine which avoids corrosion problems associated with metallic components found in prior art air cleaner housings.

Other features, objects and advantages of the prevent invention will become apparent to the reader of this specification.

SUMMARY OF THE INVENTION

An air cleaner for an internal combustion engine includes a filter element and a housing having the filter element situated therein, with the housing having an outlet for allowing filtered air to flow to the engine, and an inlet permitting the entry of air into the housing. The outlet comprises a venturi extending outwardly through an outer wall of the housing and defining a passage through the outer wall. The venturi expands radially on the inner side of the wall and is integral with the wall. The venturi comprises a generally annular wall attached at its inner extremity to a support wall cantilevered from said outer wall. The support wall extends radially and axially inwardly from the inner surface of the outer wall to the generally annular wall.

An air cleaner according to the present invention may further comprise an airflow sensor for measuring the rate at which air is passing through the air cleaner. The sensor is preferably attached to the outer wall of the housing and abuts the axial extremity of the generally annular wall of the venturi so that all the air passing into the air cleaner and thence into the engine is measured by the sensor. The airflow sensor is attached to the outer housing by fastening means which preferably comprise at least one fastener driven into at least one of the venturi walls, with the fastener extending outwardly from the outer wall of the housing.

The outer housing of an air cleaner according to the present invention preferably comprises a first clamshell half having the air inlet situated therein, and a second clamshell half having an air outlet situated therein, with the filter element comprising a generally planar structure interposed between the first and second clamshells.

DETAILED DESCRIPTION OF THE PREFERRED EMBODIMENTS

Figure 1:
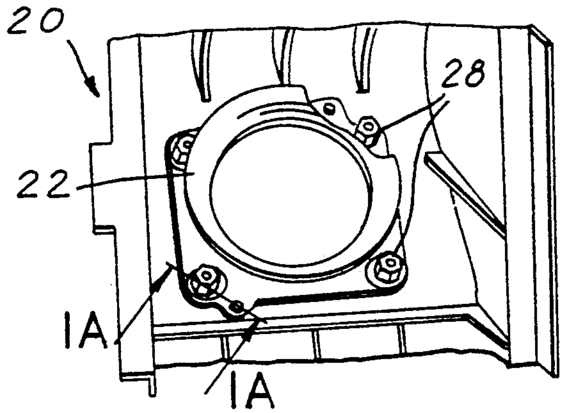
(PRIOR ART) FIG. 1
FIGS. 1 and 1A illustrate a portion of a prior art air cleaner including a non-integrated, bolted and riveted venturi assembly.
Figure 1A:
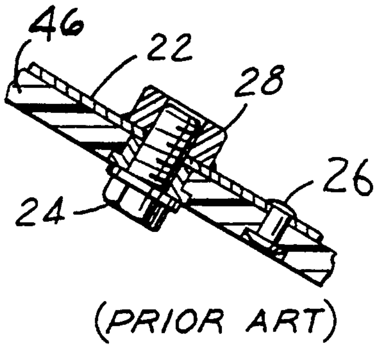
(PRIOR ART) FIG. 1A

As shown in FIGS. 1 and 1A, a prior art air cleaner includes a separate venturi, 22, attached to the inner wall of the housing by means of a plurality of bolts 24 and rivets 26. Each of the bolts and rivets penetrates the wall of the housing and provides a leakage path for unmetered air to pass through the air cleaner housing and into the engine. Note that prior art venturi 22 is not integral with the housing of the air cleaner, and as such, is provided only at higher cost than the integral venturi according to the present invention. Also, the prior art venturi being of stamped steel is subject to corrosion. Yet another undesirable characteristic of the prior art device illustrated in FIGS. 1 and 1A resides in the fact that a plurality of nuts, 28, is used on the clean air side of the filter element to retain the venturi to the air cleaner housing. Each nut is welded to the baseplate of the venturi. However, should one or more of the nuts work loose and fall into the air inlet, rapid destruction of the engine will ensue, because internal combustion engines are generally not tolerant of foreign object damage.

As noted above, it is an object of the present invention to provide an air cleaner housing having an integral venturi which obviates the need for a separate added-on venturi having the disadvantages of additional fasteners and associated leaking, and which also suffers from the disadvantage of corrosion problems.

Figure 2:
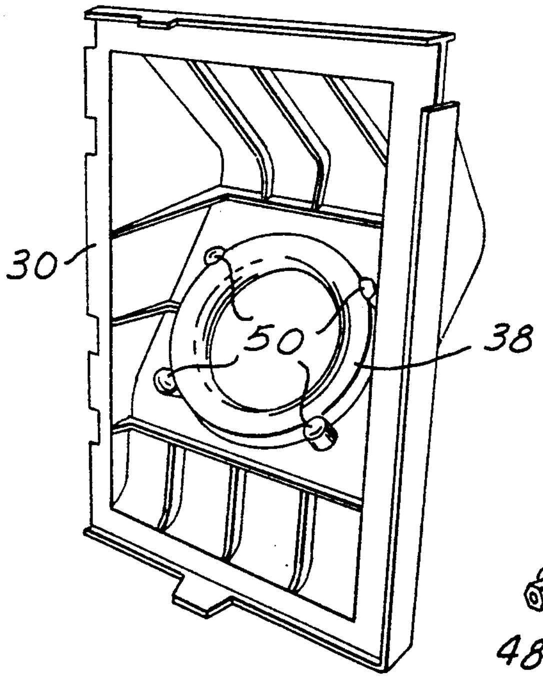
FIG. 2 is a perspective view showing the inside portion of a molded plastic air cleaner housing according to the present invention, including an integral molded venturi outlet.
Figure 3:
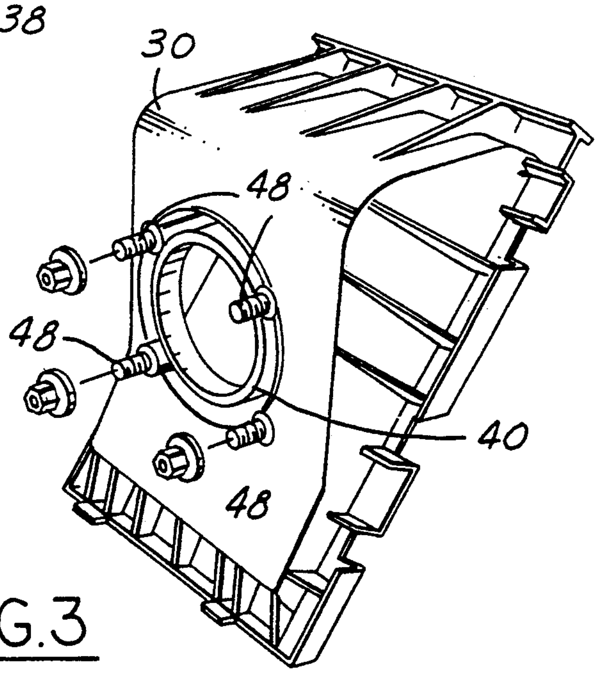
FIG. 3 is a perspective view of the component shown in FIG. 2, illustrating the outside portion of a clamshell air cleaner according to the present invention.

FIG. 2 shows an air cleaner housing according to the present invention, in which the outlet side of the housing 30 has an integral venturi 38 molded therein. As shown in FIG. 3, a plurality of fasteners 48 extends from the outer wall of the housing in a pattern which is outboard of the venturi's inner annular wall, 40.

Figure 4:
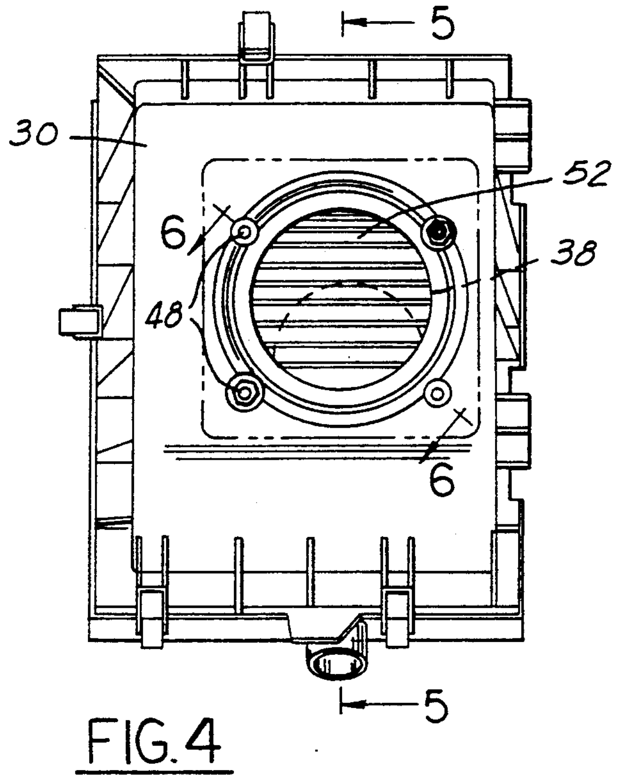
FIG. 4 is a plan view from the outlet side of an air cleaner according to the present invention illustrating the mounting of a mass airflow sensor thereon.

FIG. 4 illustrates airflow sensor 52 which is bolted to the outer side of housing 30 by means of studs 48. It is intended that a housing according to the present invention will promote precise engine operation by assuring that all of the air passing through the engine first passes through airflow sensor 52. In order for airflow sensor 52 to obtain an accurate reading, however, it is necessary that laminar flow be maintained through the venturi section of the air cleaner. In this regard, the integral molded venturi offers a significant advantage because once the shape of the venturi is set within the tooling used for molding the plastic, the venturi will be accurately and faithfully reproduced throughout the production run of air cleaners according to this invention. Unlike the case with stamped venturis, as shown in FIG. 1, an air cleaner according to the present invention will provide accurate airflow measurements unimpeded by problems associated with wear in the tools used to stamp the prior art sheet metal venturi. The present air cleaner will also obviate problems associated with improperly mounted prior art venturis, which could disrupt the desired laminar flow into the mass air meter.

Figure 5:
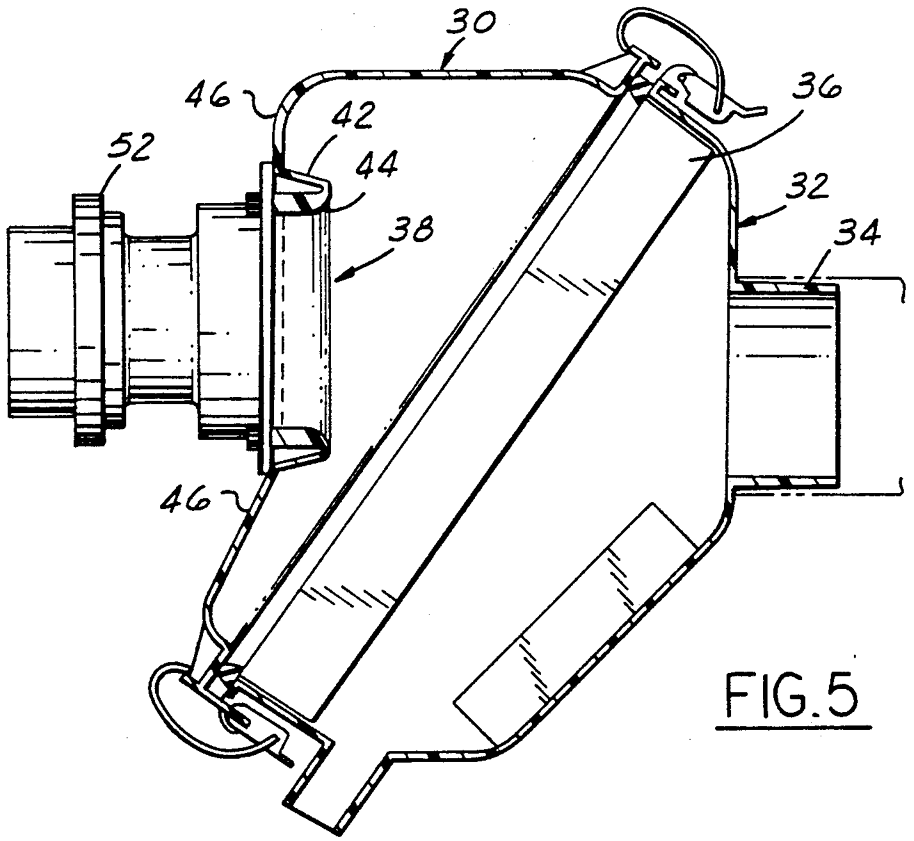
FIG. 5 is a partially broken away sectional view of an air cleaner according to the present invention taken along the line 5—5 of FIG. 4.

As shown in FIG. 5, the outlet side of housing 30 contains venturi 38. Clamshell half 30 mates with clamshell half 32, which comprises the inlet side of the housing. Filter element 36 is interposed between the inlet and outlet sides of the housing. The filter element comprises a flat element which is clamped between clamshell halves 30, 32 of the housing. Those skilled in the art will appreciate in view of this disclosure that an air cleaner according to the present invention may be configured according to a variety of designs.

Figure 6:
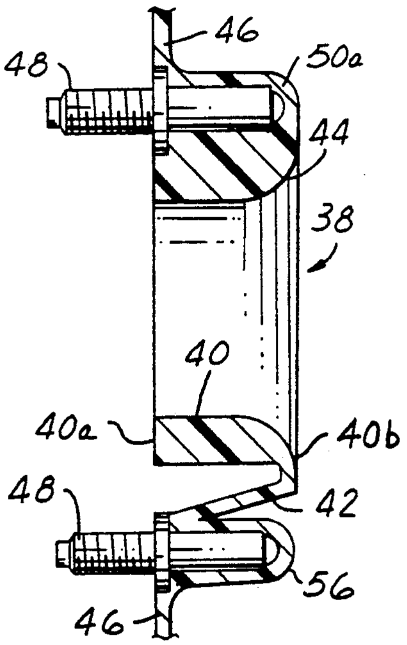
FIG. 6 is a sectional view, broken away, of the venturi portion of an air cleaner according to the present invention, taken along the line 6—6 of FIG. 4.

FIG. 6 illustrates the details of construction of a venturi according to the present invention. Inner annular wall 40 is attached at its inner extremity, 40*b*, to outer annular wall 42, which is cantilevered from outer wall 46 and which extends radially and axially inwardly to region 40*a*. The venturi expands radially on the inner side of wall 46, as shown by diverging section 44. This section allows the airflow to be laminar through venturi 38. Laminar airflow is important for accurate measurement of the mass airflow passing through sensor 52. Airflow sensor 52 is attached to outer wall 46 by means of studs 48 so that airflow sensor 52 is in sealing contact with the axial extremity 40*a* of inner annular wall 40. In this manner, air passing into the air cleaner is accurately measured by sensor 52. In essence, the venturi according to the present invention may be viewed as comprising a double walled, siamesed annulus, with outer annular wall 42 extending axially and radially inwardly from outer wall 46 of the housing to a siamesed inner annular wall 40 extending axially outward to the outer surface of the housing. Because an air cleaner housing according to the present invention is preferably made of molded plastic, such a housing will provide a leakproof, and, accordingly, accurate measure of the flow of air entering the engine.

FIG. 6 illustrates that a plurality of fasteners 48 may be provided for the purpose of mounting airflow sensor 52 to the axial extremity of the generally annular wall of the venturi so that all of the air passing into the engine passes through the filter element first. Each fastener is driven into and extends from a boss which is situated either between the annular walls comprising the venturi, as is the case with boss 50*a*, or outboard from the outer annular wall of venturi 38, as is the case with boss 50*b*. While the invention has been shown and described in its preferred embodiments, it will be clear to those skilled in the arts to which they pertain that many changes and modifications may be made thereto without departing from the scope of the invention.

I claim:

1. An air cleaner for an internal combustion engine, comprising:

a filter element;

a housing having said filter element situated therein, with said housing having an outlet for allowing filtered air to flow to said engine and an inlet permitting the entry of air into the housing, with said outlet comprising:

a venturi extending outwardly through and integral with an outer wall of said housing and defining a passage through said wall, with said venturi comprising a generally annular wall attached at its inner extremity to a support wall cantilevered from said outer wall and extending radially and axially inwardly to said generally annular wall; and an airflow sensor for measuring the rate at which air is passing through the air cleaner, with said sensor being attached to the outer wall of the housing and abutting the axial extremity of the generally annular wall of said venturi so that all of the air passing out of the air cleaner is measured by the sensor, with said sensor being attached to said outer wall by fastening means associated with said venturi.

2. An air cleaner according to claim 1, wherein said fastening means comprises at least one fastener driven into at least one of said venturi walls and extending outwardly from said outer wall.

3. An air cleaner for an internal combustion engine, comprising:

a filter element; and a molded plastic housing having said filter element situated therein, with said housing having an outlet for allowing filtered air to flow to said engine and an inlet permitting the entry of air into the housing, with said outlet comprising:

a venturi extending outwardly through an outer wall of said housing and defining a passage through said wall, with said venturi expanding radially on the inner side of the wall, and with said venturi being molded integrally with said wall with said venturi comprising a double walled, siamesed annulus, with an outer annular wall extending axially and radially inwardly from the outer wall of the housing to a siamesed inner annular wall extending axially outward to the outer surface of the housing.

4. An air cleaner according to claim 3, further comprising a mass airflow sensor fastened to the outer wall of the housing and overlying the passage defined by said venturi.

5. A remotely mountable air cleaner for an internal combustion engine, comprising:

a filter element;

a molded plastic housing having said filter element situated therein, with said housing having an outlet adapted for connection to a conduit running to the air inlet of an engine, said housing also having an inlet permitting the entry of air from a supply conduit into the housing, with said outlet comprising:

a venturi extending inwardly through an outer wall of said housing and defining a passage through said wall, with said venturi expanding radially on the inner side of the wall, and with said venturi being molded integrally with said wall; and a mass airflow sensor attached to the outer wall of the housing by fastening means, with said sensor overlying the passage defined by said venturi such that all air exiting said air cleaner must pass through said airflow sensor wherein said fastening means comprises a plurality of fasteners molded into and extending from the outer wall of the housing.

6. An air cleaner according to claim 5, wherein said housing comprises a first clamshell half having said inlet situated therein and a second clamshell half having said outlet situated therein, with said filter element comprising a generally planar structure interposed between said first and second clamshells.

* * * * *